(12) United States Patent
Huang et al.

(10) Patent No.: US 9,240,910 B2
(45) Date of Patent: Jan. 19, 2016

(54) OUT-OF-BAND EMISSION CANCELLATION

(75) Inventors: Xiaojing Huang, North Ryde (AU);
Yingjie Jay Guo, Beecroft (AU)

(73) Assignee: Commonwealth Scientific and Industrial Research Organisation, Campell, Australian Capital Territory (AU)

( * ) Notice: Subject to any disclaimer, the term of this patent is extended or adjusted under 35 U.S.C. 154(b) by 0 days.

(21) Appl. No.: 13/504,456

(22) PCT Filed: Oct. 14, 2010

(86) PCT No.: PCT/AU2010/001356
§ 371 (c)(1),
(2), (4) Date: Jul. 11, 2012

(87) PCT Pub. No.: WO2011/050392
PCT Pub. Date: May 5, 2011

(65) Prior Publication Data
US 2012/0269286 A1 Oct. 25, 2012

Related U.S. Application Data

(60) Provisional application No. 61/256,778, filed on Oct. 30, 2009.

(30) Foreign Application Priority Data

Oct. 30, 2009 (AU) .............................. 2009905333

(51) Int. Cl.
*H04L 25/02* (2006.01)
*H04L 5/00* (2006.01)
(Continued)

(52) U.S. Cl.
CPC .......... *H04L 25/0248* (2013.01); *H04L 5/0007* (2013.01); *H04L 25/03343* (2013.01); *H04L 27/2626* (2013.01); *H04L 27/2647* (2013.01); *H04B 7/0617* (2013.01); *H04L 2025/03414* (2013.01)

(58) Field of Classification Search
USPC ................. 375/260, 268, 284, 295, 296, 340; 455/69, 114.2, 109, 502, 522
See application file for complete search history.

(56) References Cited

U.S. PATENT DOCUMENTS

| 6,081,697 A | 6/2000 | Haartsen |
| 6,985,704 B2 | 1/2006 | Yang et al. |

(Continued)

FOREIGN PATENT DOCUMENTS

| JP | 2009-516942 A | 4/2009 |
| WO | WO 2007/081173 | 7/2007 |
| WO | WO 2009/117874 | 10/2009 |

OTHER PUBLICATIONS

International Preliminary Report on Patentability for PCT/AU2010/001356, dated Nov. 23, 2010.
(Continued)

*Primary Examiner* — Leon-Viet Nguyen
(74) *Attorney, Agent, or Firm* — Brinks Gilson & Lione

(57) ABSTRACT

A transmission signal pre-processing method and apparatus for out-of-band emission cancellation are disclosed. For each of N subchannels in a band weighting each of N subchannel symbols by a calculated value in the range from 0 to 1 is performed. Precoding said N weighted symbols, organised as an N×1 matrix, by multiplication by a unitary matrix is then performed.

12 Claims, 7 Drawing Sheets

Out-of-Band Emission Cancellation

(51) Int. Cl.
*H04L 25/03* (2006.01)
*H04L 27/26* (2006.01)
*H04B 7/06* (2006.01)

(56) References Cited

U.S. PATENT DOCUMENTS

| | | | |
|---|---|---|---|
| 7,013,161 B2 | 3/2006 | Morris | |
| 7,248,639 B2 | 7/2007 | Rudolph et al. | |
| 7,403,470 B2 | 7/2008 | Lane et al. | |
| 7,409,009 B2 | 8/2008 | Akhtman | |
| 7,409,010 B2 | 8/2008 | McHenry | |
| 7,542,517 B2 | 6/2009 | Kroeger | |
| 7,542,736 B2 | 6/2009 | Sarraf | |
| 7,574,224 B2 | 8/2009 | Lane et al. | |
| 8,218,697 B2* | 7/2012 | Guess et al. | 375/346 |
| 8,285,319 B2* | 10/2012 | Shin et al. | 455/522 |
| 2009/0168913 A1* | 7/2009 | Nakagiri | 375/260 |
| 2010/0046666 A1* | 2/2010 | Ketchum et al. | 375/296 |
| 2010/0110996 A1* | 5/2010 | Tao et al. | 370/329 |
| 2012/0099666 A1* | 4/2012 | Baldemair et al. | 375/260 |

OTHER PUBLICATIONS

IEEE Standard 802.11a-1999, "Part 11: Wireless LAN Medium Access Control (MAC) and Physical Layer (PHY) Specifications: High-speed Physical Layer in the 5 GHz Band".

IEEE Standard 802.11g-2003, "Part 11: Wireless LAN Medium Access Control (MAC) and Physical Layer (PHY) Specifications: High-speed Physical Layer in the 2.4 GHz Band".

S. Brandes, I. Cosovic, and M. Schnell, "Reduction of Out-of-Band Radiation in OFDM Systems by Insertion of Cancellation Carriers," IEEE Communications Letters, vol. 10, No. 6, Jun. 2006, pp. 420-422.

IEEE Standard 802.11n, "Part 11: Wireless LAN Medium Access Control (MAC) and Physical Layer (PHY) Specifications, Amendment 5: Enhancements for Higher Throughput".

Hyejung Jung; Cudak, M.; Baum, K.; Nangia, V.; "Impact of Out-of-Band Emission in OFDM and in DFT-SOFDM", *Vehicular Technology Conference*, 2009. VTC Spring 2009. IEEE 69th Apr. 26-29, 2009 pp. 1-5.

Lampe, M.; Rohling, H.; "Reducing out-of-band emissions due to nonlinearities in OFDM systems", *Vehicular Technology Conference*, 1999 IEEE 49th vol. 3, May 16-20, 1999 pp. 2255-2259 vol. 3.

Van De Beek, J.; Berggren, F.; "Out-of-Band Power Suppression in OFDM"; *Communications Letters, IEEE* vol. 12, Issue 9, Sep. 2008 pp. 609-611.

Grubesa, T.; Orlic, N.; Grubesa, S.; "Elimination of out-of-band emissions in Digital Radio Mondiale transmissions using the genetic algorithm"; *Information Technolgoy Interfaces*, 2008. ITI 2008. 30th International Conference on Jun. 23-26, 2008 pp. 723-728.

Guel, D.; Palicot, J.; "OFDM PAPR Reduction Based on Nonlinear Functions without BER Degradation and Out-of-Band Emission"; *2009 International Conference on Signal Processing Systems* May 15-17, 2009 pp. 167-171.

Waldhauser, D.S.; Baltar, L.G.; Nossek, J.A.; "Adaptive equalization for filter bank based multicarrier systems"; *Circuits and Systems*, 2008, ISCAS 2008. IEEE International Symposium on May 18-21, 2008 pp. 3098-3101.

Saito, M.; Okuda, A.; Okada, M.; Yamamoto, H.; "Distortionless PAPR Reduction Method for Existing OFDM Systems"; *Wireless Communication Systems*, 2005. 2nd International Sympossium on Sep. 7-7, 2005 pp. 404-408.

Pagadarai, S.; Wyglinski, A.M.; Rajbanshi, R.; "A Novel Sidelobe Suppression Technique for OFDM-Based Cognitive Radio Transmission"; *New Frontiers in Dynamic Spectrum Access Networks*, 2008, DySPAN 2008, 3rd IEEE Symposium on Oct. 14-17, 2008 pp. 1-7.

Akhtman, J.; Bobrovsky, B.Z.; Hanzo, L.; "Peak-to-average power ratio reduction for OFDM modems"; *Vehicular Technology Conference*, 2003, VTC 2003-Spring. The 57th IEEE Semiannual vol. 2, Apr. 22-25, 2003 pp. 1188-1192 vol. 2.

Izuka, N.; Daido, Y.; Mizuno, S.; Yamakita, Y.; "Spectrum-shaping method to improve spectral efficiency of OFDM systems"; *Communication Systems*, 2002, ICCS 2002. The 8th International Conference on vol. 1, Nov. 25-28, 2002 pp. 234-238 vol. 1.

Horiuchi, T.; Weizu Yang; Ohtsuki, T.; Sasase, L.; "Performance evaluation of OFDM with the compensation technique of the nonlinear distortion using partial transmit sequence and predistortion"; *Vehicular Technology Conference*, 2001. VTC 2001 Fall. IEEE VTS 54th vol. 2, Oct. 7-11, 2001 pp. 655-659 vol. 2.

Waldhauser, D.S.; Baltar, L.G.; Nossek, J.A.; "MMSE subcarrier equalization for filter bank based multicarried systems"; *Signal Processing Advances in Wireless Communications*, 2008. SPAWC 2008. IEEE 9th Workshop on Jul. 6-9, 2008 pp. 525-529.

Han-Shin Jo; Hyun-Goo Yoon; JaeWoo Lim; Jong-Gwan Yook; "An Advanced MCL Method for Assessing Interference Potential of OFDM-Based Systems beyond 3G with Dynamic Power Allocation"; *Wireless Technology*, 2006. The 9th European Conference on Sep. 10-12, 2006 pp. 39-42.

Walker, B.W.; Ilow, J.; "Spectral Regrowth Reduction for Digital Audio Broadcasting Using EER Amplifiers" *Communication Networks and Services Research Conference*, 2008. CNSR 2008. 6th Annual May 5-8, 2008 pp. 185-190.

Khan, S.; Khattab, T.; Alnuweiri, H.; "Analysis and modeling of physical layer alternatives in OFDM based WLANs"; *Wireless Networks, Communications and Mobile Computing*, 2005 International Conference on vol. 1, Jun. 13-16, 2005 pp. 75-80 vol. 1.

van de Beek, J.; Berggren, F.; "N-continuous OFDM"; *Communications Letters, IEEE* vol. 13, Issue 1, Jan. 2009 pp. 1-3.

Cosovic, Ivan, Member, IEEE; Brandes, Sinja, Member, IEEE; and Schnell, Michael, Senior Member, IEEE; "Subcarrier Weighting: A Method for Sidelobe Suppression in OFDM System"; *IEEE Communications Letters*, vol. 10, No. 6, Jun. 2006.

Renhui Xu et al., "A Precoding Scheme for DFT-Based OFDM to Suppress Sidelobes," IEE Communications Letters, vol. 13, No. 10, Oct. 2009, pp. 776-778.

Atsushi Minakawa, *A Study on Interference Suppression using Weighting factors for MB-OFDM systems*, Technical Report of the Institute of Electronics, Information and Communication Engineers, Mar. 2, 2009, vol. 108, No. 474, pp. 199-204.

Char-Dir Chung, *Spectrally Precoded OFDM with Cyclic Prefix*, Communications, 2007. ICC '07. IEEE International Conference on Jun. 28, 2007, pp. 5428-5432.

Char-Dir Chung, *Spectral precoding for rectangularly pulsed OFDM*, Communications, IEEE Transactions on Sep. 2008, vol. 56, No. 9, pp. 1498-1510.

Hiroaki Miyasaka et al., *A Study on iterative detection of pre-coded OFDM using block code*, Technical Report of the Institute of Image Information and Television Engineers, Jul. 31, 2008, vol. 32, No. 33, pp. 1-4.

Hiroaki Miyasaka et al., *A Study on iterative detection of pre-coded OFDM using block code*, Technical Report of the Institute of Electronics, Information and Communication Engineers, Dec. 12, 2007, vol. 107, No. 396, pp. 13-18.

Xiang-Gen Xia, *Precoded and vector OFDM robust to channel spectral nulls and with reduced cyclic prefix length in single transmit antenna systems*, Communications, IEEE Transactions on Aug. 2001, vol. 49, No. 8, pp. 1363-1374.

\* cited by examiner

OUT-OF-BAND EMISSION CANCELLATION

This application is a National Stage of International Application No. PCT/AU2010/001356 filed on Oct. 14, 2010 which claims priority to Australian Patent Application No. 2009905333 filed on Oct. 30, 2009, and U.S. Provisional Patent Application No. 61/256,778 filed on Oct. 30, 2009, the entirety of which are hereby incorporated by reference.

TECHNICAL FIELD

The invention relates to multiband wireless communication systems, and particularly to the cancellation of out-of-band emissions.

BACKGROUND

Due to the scarcity of radio spectrum resources and the demand for high speed data transmission, wireless communication systems are required to achieve higher spectral efficiency as well as higher power and cost efficiencies. With the advance of digital signal processing and radio technologies, multiband systems have become more and more appealing since they can accommodate wider spectrum for achieving higher data rates and provide more flexible and adaptive use of the existing frequency bands.

Orthogonal frequency division multiplexing (OFDM) has been widely used in recent times in various single band communications systems, such as the wireless local area networks (WLANs) and the 3$^{rd}$ Generation Partnership Project (3GPP; www.3gpp.org) Long Term Evolution (LTE) systems. OFDM is characterised by adjacent subchannels within a band exhibiting orthogonality. OFDM is also a suitable modulation technique for use in multiband systems due to the flexibility for subcarrier allocation and the implementation simplicity with fast Fourier transform (FFT) as a frequency band can be dynamically selected or de-selected by turning on or off the subcarriers falling in the band according to the band assignment. However, OFDM exhibits out-of-band emission due to the slow side lobe roll-off of the subcarriers, which can cause inter-channel interference without further reduction to meet the transmit mask requirement.

There are existing techniques for out-of-band emission reduction in OFDM-based multiband systems. The first straightforward technique is to apply notch filters to the unallocated bands. However, a digital implementation of this filter would increase the processing complexity considerably, and an analogue implementation would be costly and difficult to achieve dynamic band allocation.

The second technique is to introduce guard bands on the edges of the transmitted signal bands. Unfortunately, this will sacrifice spectral efficiency and may not be able to provide sufficient protection without having significantly large number of subcarriers used for an allocated frequency band.

The third technique is to perfoun windowing to the transmitted signal in the time-domain. This requires an extended OFDM symbol with extra signal power and causes inter-symbol interference. Guard bands may also need to be used together with windowing to ensure satisfactory out-of-band emission reduction. (See, for example, IEEE Standard 802.11a-1999, "Part 11: Wireless LAN Medium Access Control (MAC) and Physical Layer (PHY) Specifications: High-speed Physical Layer in the 5 GHz Band".)

The fourth technique is to compose interference cancellation subcarriers and place them on the edges of the transmitted signal bands. This technique not only reduces the spectral efficiency but also degrades the effective signal-to-noise ratio (SNR) at the receiver since the extra signal power for the cancellation is wasted. (See, for example, S. Brandes, I. Cosovic, and M. Schnell, "Reduction of Out-of-Band Radiation in OFDM Systems by Insertion of Cancellation Carriers," IEEE Communications Letters, Vol. 10, No. 6, June 2006, pp. 420-422.)

There is therefore a need for out-of-band emission cancellation techniques which can substantially avoid the problems of the known approaches.

SUMMARY

There is disclosed a transmission signal pre-processing method for out-of-band emission cancellation, comprising, for each of N subchannels in a band: weighting each of N subchannel symbols by a calculated value in the range from 0 to 1; and precoding said N weighted symbols, by multiplication by a unitary matrix.

There is further disclosed a transmission signal pre-processing method for out-of-band emission cancellation, comprising, for each of N subchannels in a band: weighting at least n of N subchannel symbols by a calculated value in the range from 0 to 1; and precoding said weighted symbols, organised as a n×1 matrix, by multiplication by a n×n unitary matrix.

There is yet further disclosed a reception signal processing method for out-of-band emission cancellation comprising: de-precoding received symbols by unitary matrix multiplication, where the reception unitary matrix is the transpose of a precoding matrix used at transmission; and de-weighting said de-precoded symbols by dividing by a respective weight used at transmission.

There is yet further disclosed an out-of-band emission cancellation method comprising: performing mapping of input data bits into time domain data symbols; converting said time domain symbols into a plurality of subchannels; for each of N subchannels in a band: weighting each of N subchannel symbols by a calculated value in the range from 0 to 1; and precoding said N weighted symbols by multiplication by a unitary matrix; transforming said precoded subchannels into orthogonal time domain subchannels; and transmitting said time domain subchannels.

There is yet further disclosed a transmitter comprising: a module performing mapping of input data bits into time domain data symbols; a module converting said time domain symbols into a plurality of subchannels; for each of N subchannels in a band: a module weighting each of N subchannel symbols by a calculated value in the range from 0 to 1; and a module precoding said N weighted symbols by multiplication by a unitary matrix; a module transforming said precoded subchannels into orthogonal time domain subchannels; and a radio frequency module transmitting said time domain subchannels.

There is yet further disclosed a receiver comprising: a radio frequency module receiving a plurality of time domain orthogonal subchannels; a module transforming said received subchannels into frequency domain subchannels; for each of N subchannels: de-precoding received symbols by unitary matrix multiplication, where the reception unitary matrix is the transpose of a precoding matrix used at transmission; and de-weighting said de-precoded symbols by dividing by a respective weight used at transmission; a module converting said de-weighted symbols into a sequence of symbols; and a module performing mapping of said sequence of symbols to output data bits.

There is yet further disclosed a transceiver comprising a transmitter and a receiver as immediately above.

DETAILED DESCRIPTION

Figure 1:
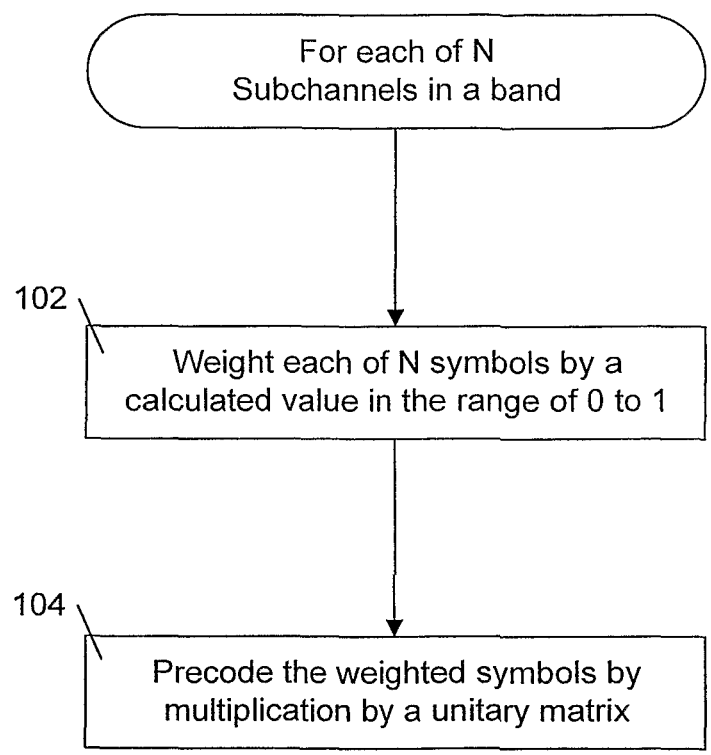
FIG. 1 is a block diagram of a broad method embodying the invention.

Where reference is made in any one or more of the accompanying diagrams to steps and/or features which have the same reference numerals, those steps and/or features have for the purpose of this description the same functions(s) or operations(s), unless the contrary intention appears.

In what follows, the expression "module" is to be understood as a general term for circuit elements, which can be implemented in many convenient forms, such as software running on a processor, firmware and FPGAs in the digital domain, and as discrete circuits in the analogue domain. Also, matrix algebra when implemented in code or circuitry can be done in many convenient forms, involving multiplication and addition operations, as would be apparent to a person of ordinary skill in the art.

FIG. 1 is a block flow diagram of a broad transmission pre-processing method 100 for out-of-band emission cancellation embodying the invention. For each of N subchannels in a band, at step 102 each of N subchannel symbols is weighted by a calculated value in the range 0 to 1. At step 104, the weighted symbols are precoded by multiplication by a unitary matrix.

Figure 2:
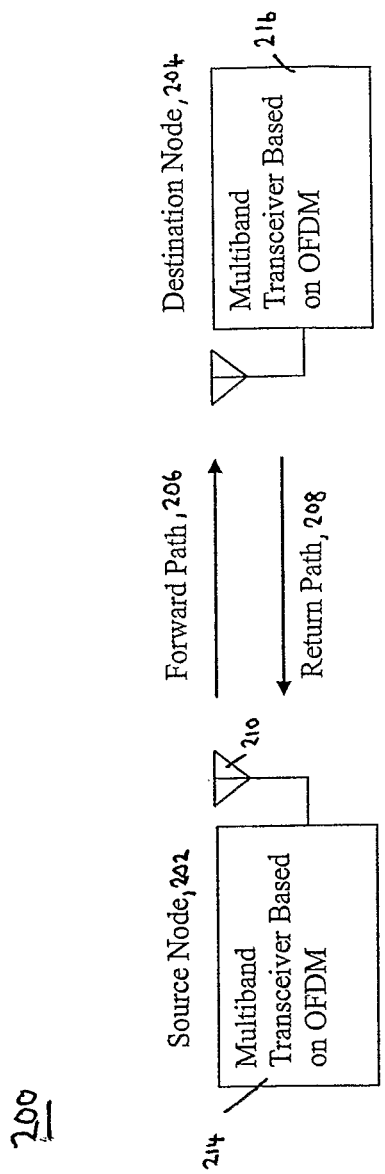
FIG. 2 is a schematic block diagram of example multiband transceivers based on OFDM with source and destination nodes.

A multiband wireless communications system 200 based on OFDM is illustrated in FIG. 2. The system 200 includes two communicating nodes: one is the source node 202 and the other is the destination node 204. The source node 202 transmits data information in multiple frequency bands, and the destination node 204 receives data information from at least one of the multiple frequency bands via a forward path 206. The destination node 204 may also provide channel state information (CSI) to the source node 202, acknowledge the received data packets, and/or transmit data information to the source node in at least one frequency band via a return path 208. Both the source and the destination nodes 202, 204 are equipped with single-element antennas or antenna arrays 210, 212, respectively. To reduce the inter-channel interference at the receiver (within the source and destination transceivers 214, 216), a signal from any frequency band allocated for other users must produce as little as possible emission into the frequency bands allocated to the user concerned. The permitted transmit power spectral density for a frequency band is often referred to as the transmit mask. When data symbols are modulated on multiple subcarriers in a frequency band using the OFDM technique, the out-of-band emission is significant, and the typical transmit mask is often not met due to the slow sidelobe roll-off of the subcarrier. This can lead to intolerable interference to users operating in the adjacent bands, as mentioned above.

Figure 3:
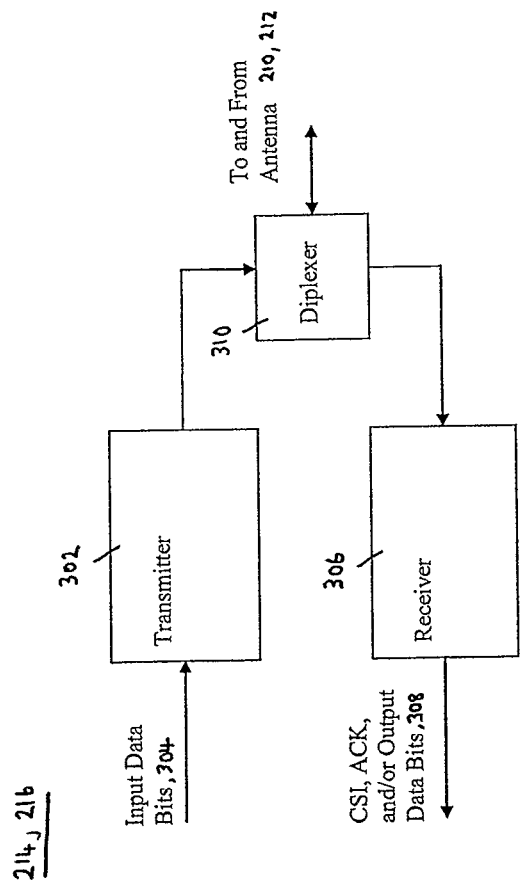
FIG. 3 is a schematic block diagram of an example transceiver.

As shown in FIG. 3, the transceiver 214, 216 at either the source node 202 or the destination node 204 includes a transmitter 302 which composes the input data bits 304 to form data packets and transmits the data packets using OFDM modulation in multiple frequency bands, a receiver 306 which receives the CSI, acknowledgement (ACK) information and/or data packets 308 using OFDM demodulation in multiple frequency bands, and a diplexer 310 which switches the signal path between the transmitter 302 and the receiver 306.

Figure 4:
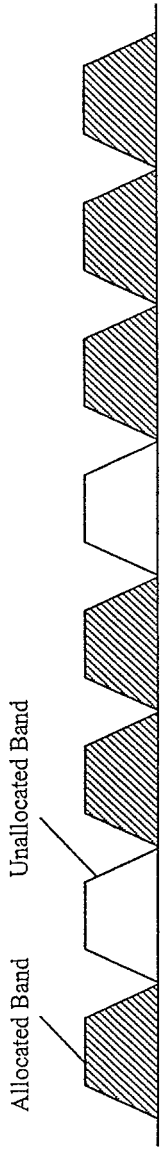
FIG. 4 is an example multiband arrangement.

The transmitter 302 and the receiver 306 may have different frequency band arrangements for different nodes. FIG. 4 shows an example of the multiband arrangement 400 for the transmitter 302, where eight bands, numbered 1 to 8, are accommodated but only six bands, numbered 1, 3, 4, 6, 7, and 8, are allocated to one user and bands 2 and 5 are allocated to a different user (i.e., "unallocated" to the first user). The receiver 306 receives a signal from one or more of the "allocated bands". Any transmitting band must meet a certain transmit mask requirement so as no to interfere with the transmission of other users in any "unallocated band".

Figure 5:
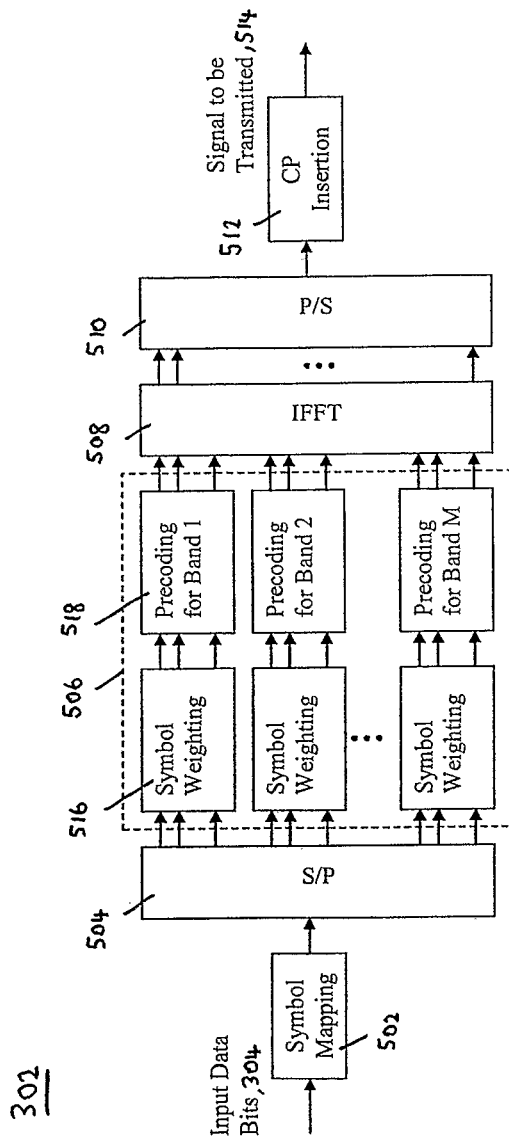
FIG. 5 is a schematic block diagram of an example transmitter with out-of-band emission cancellation.

A schematic block diagram of the transmitter 302 providing out-of-band emission cancellation is shown in FIG. 5. The input data bits 304 are firstly mapped by a symbol mapping module 502 into data symbols (i.e., complex numbers) using symbol constellation mapping techniques such as binary phase shift keying (BPSK), quadrature phase shift keying (QPSK), or quadrature amplitude modulation (QAM).

The data symbols are then assigned to N subcarriers in each of the M allocated bands after passing through a serial-to-parallel conversion (S/P) module 504. (The subcarriers in the unallocated bands are nulled.) After the out-of-band emission cancellation is performed (by the grouped module 506, to be described later), an inverse fast Fourier transform (IFFT) is performed by an IFFT module 508, followed by a parallel-to-serial conversion (P/S) by a module 510, to convert the frequency domain symbols to time domain samples. After cyclic prefix insertion by a module 512, the OFDM signal 514 has been formed and transmitted by the transmitter antenna 210, 212. The RF circuitry chain after the CP insertion module 512 is not shown for clarity's sake, however it will be understood that there are IF and/or RF stages present before the antenna. Since there are total M frequency bands, each having N subcarriers, the IFFT size is MN. Nevertheless, each (allocated) band can have a different number of subcarriers.

The out-of-band emission cancellation is applied to all the allocated bands (e.g., 1, 3-4, and 6-8). The pre-processing includes two steps, performed by the pre-processing module 506 for each subchannel. Therefore, for each subchannel, a symbol weighting module 516 multiplies each of a sequence of N symbols by a weight having a real value in a range from 0 to 1. A limit weight of value 0 means that the symbol is not transmitted whereas a limit weight value of 1 means that the symbol is transmitted with full power. A precoding module 518 then multiplies the weighted symbols by a unitary matrix. This preprocessing is effective to cancel out-of-band emissions. Here, "cancel" is not meant in absolute terms, rather in effective engineering terms, and is synonymous with "reduce to a point of insignificance" or the like.

In another form, only a subset n of the N subchannels within a band is subjected to the pre-processing. The n subchannels are those immediately adjacent to one or both band edges, and $1 \leq n \ll N$.

Two embodiments of weight selection and choice of precoding matrix will now be described. One embodiment is a single side out-of-band emission cancellation, and the other is a double sided out-of-band emission cancellation. The single side out-of-band emission cancellation may be used when multiple bands are adjacent to each other to form a contiguous larger band and only the bands on the two sides of the larger band are used for out-of-band emission cancellation. The double side out-of-band emission cancellation may be used when a band is standalone with unallocated bands on both sides. However, the double side out-of-band emission cancellation can be also used by all bands in a contiguous large band.

Single Side Out-of Band Emission Cancellation

For the single side out-of-band emission cancellation, the weights and precoding matrix are selected as follows.

1. Define an N-by-1 vector $$c_1 = \left( \frac{1}{w}, \frac{1}{w+1}, \dots, \frac{1}{w+N-1} \right)^T \quad (1)$$

where w>0 is a frequency normalized by the subcarrier spacing. Call w the cancellation distance since it is the distance between the edge of a transmission band and a cancellation point on either side of the band, at which the out-of-band emission is cancelled. An element $$\frac{1}{w+i}$$

for i=0,1,..., N−1 in $c_1$ represents the spectral attenuation from the center of a subcarrier i in the transmission band to the cancellation point. Call $c_1$ the single side spectral attenuation vector.

2. Perform singular value decomposition for matrix $$I_N - \frac{c_1 c_1^T}{\text{trace}(c_1 c_1^T)}$$

where $I_N$ is the identity matrix of order N, i.e., $$I_N - \frac{c_1 c_1^T}{\text{trace}(c_1 c_1^T)} = U_1 W_1 V_1^T \quad (2)$$

where $U_1$ and $V_1$ are (N×N) unitary matrices and $W_1$ is a (N×N) diagonal matrix with positive diagonal elements. It is the subtracted correction term in the left hand side of (2) that achieved the out-of-band cancellation effectively by causing an appropriate power reduction in the relevant subchannels so as to be of insignificance in an adjacent other user's ("unallocated") band.

3. The diagonal elements in $W_1$ are utilised as the weights and $U_1$ is utilised as the precoding matrix for the single side out-of-band emission cancellation.

It is evident from (2) that the weights determined from $W_1$ are all equal to 1 except for one zero, which means that one data symbol can not be transmitted. (This is because the rank of $$\frac{c_1 c_1^T}{\text{trace}(c_1 c_1^T)}$$

is 1 and it has only one non-zero eigenvalue 1.) In other words, each of the N subcarriers can only transmit N−1 data symbols.

Suppose that the data symbols $s_0, s_1, s_{N-1}$ can be expressed as a vector $s = (s_0, s_1, \dots, s_{N-1})^T$. The symbol weighting and precoding process can be mathematically expressed, in matrix algebra, as $U_1, W_1 s$. That is, N symbols are organised as a column matrix and multiplied by $W_1$, then matrix multiplied by $U_1$.

Note also from (2) that the weights and precoding matrix are determined only by the number of subcarriers in a transmission band, N, and a predetermined cancellation distance, w. In other words, the out-of-band cancellation can be achieved as a function of only these two variables, which are readily known or chosen. The weights and the precoding matrix can be calculated in advance of transmission rather than in real-time, which is advantageous in reserving processing time for data transmission purposes.

Double Side Out-of-Band Emission Cancellation

For the double side out-of-band emission cancellation, the weights and precoding matrix are selected as follows.

1. Define an N-by-2 vector $$c_2 = \left( \begin{array}{cccc} \frac{1}{w}, & \frac{1}{w+1}, & \dots, & \frac{1}{w+N-1} \\ \frac{1}{w+N-1}, & \frac{1}{w+N-2}, & \dots, & \frac{1}{w} \end{array} \right)^T \quad (3)$$

where w>0 is a normalized frequency relative to the subcarrier spacing and is also called the cancellation distance. In this case, the cancellation points are symmetrically located on both sides of the transmission band. Call $c_2$ the double side spectral attenuation vector.

2. Perform singular value decomposition for matrix $$I_N - \frac{c_2 c_2^T}{\text{trace}(c_2 c_2^T)}$$

where $I_N$ is the identity matrix of order N, i.e., $$I_N - \frac{c_2 c_2^T}{\text{trace}(c_2 c_2^T)} = U_2 W_2 V_2^T \quad (4)$$

where $U_2$ and $V_2$ are unitary matrices and $W_2$ is a diagonal matrix with positive diagonal elements.

3. The diagonal elements in $W_2$ are the weights and $U_2$ is the precoding matrix for the double side out-of-band emission cancellation.

It is evident from (4) that the weights determined from $W_2$ are all equal to 1 except for two values greater than 0 but less than 1, which means that all data symbols are transmitted but two of them with reduced power. (This is because the rank of $$\frac{c_2 c_2^T}{\text{trace}(c_2 c_2^T)}$$

is 2 and it has only two non-zero eigenvalues.) For further out-of-band emission reduction, the weights which are not equal to 1 can be set to zero, which means that two data symbols can not be transmitted.

Similarly, the symbol weighting and precoding process can be mathematically expressed as $U_2 W_2 s$.

Figure 6:
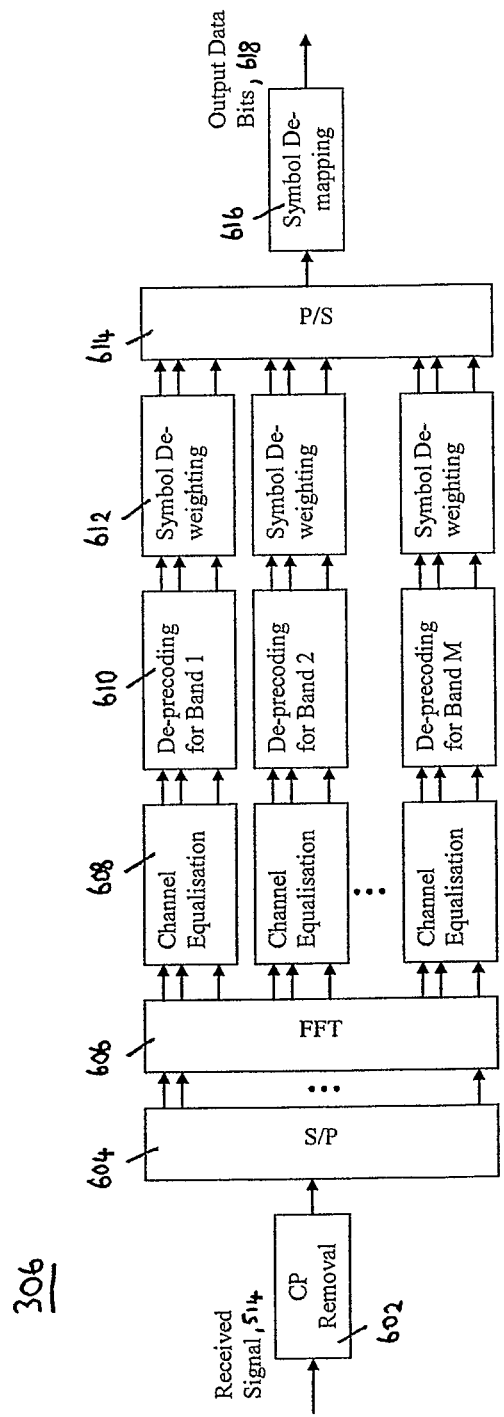
FIG. 6 is a schematic block diagram of an example receiver adapted for out-of-band emission cancellation.

The corresponding receiver 306 to receive the signal 514 generated by the transmitter 302 after out-of-band emission cancellation is shown in FIG. 6. The CPs of the received OFDM symbols are first removed by a CP removal module 602. The resulting OFDM symbols are then converted into the frequency-domain after passing through an S/P module 604 and a Fast Fourier transform (FFT) module 606. Subcarriers in each allocated band are then equalised by a respective channel equalisation module 608 to compensate for the propagation effects. The unitary matrix $U_1^T$ (if $U_1$, is used at the transmitter) or $U_2^T$ (if $U_2$ is used at the transmitter) is then used in a respective De-precoding module 610 to compensate for the precoding performed at the transmitter 302. The transmitted data symbol is recovered after passing through a respective symbol de-weighting module 612, which involves dividing by the corresponding weight for the data symbol if the weight is not zero. All the recovered data symbols 618 are retrieved into data bits after passing through a P/S module 614 and a symbol demapping module 616.

Figure 7:
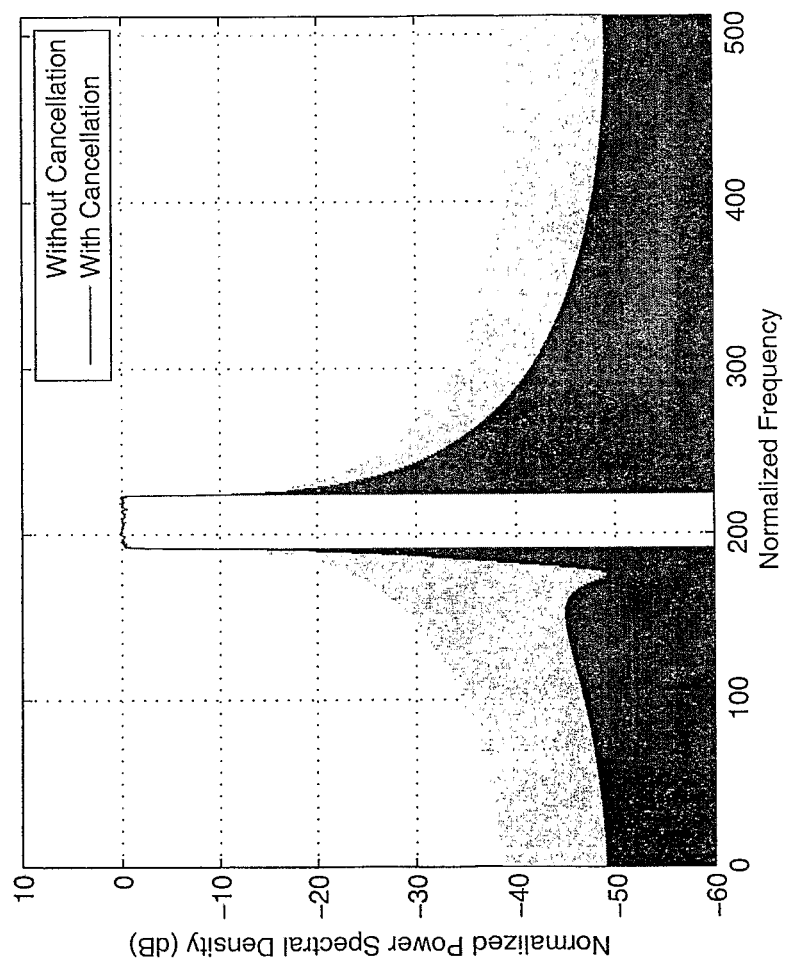
FIG. 7 shows the performance of single side out-of-band emission cancellation.
Figure 8:
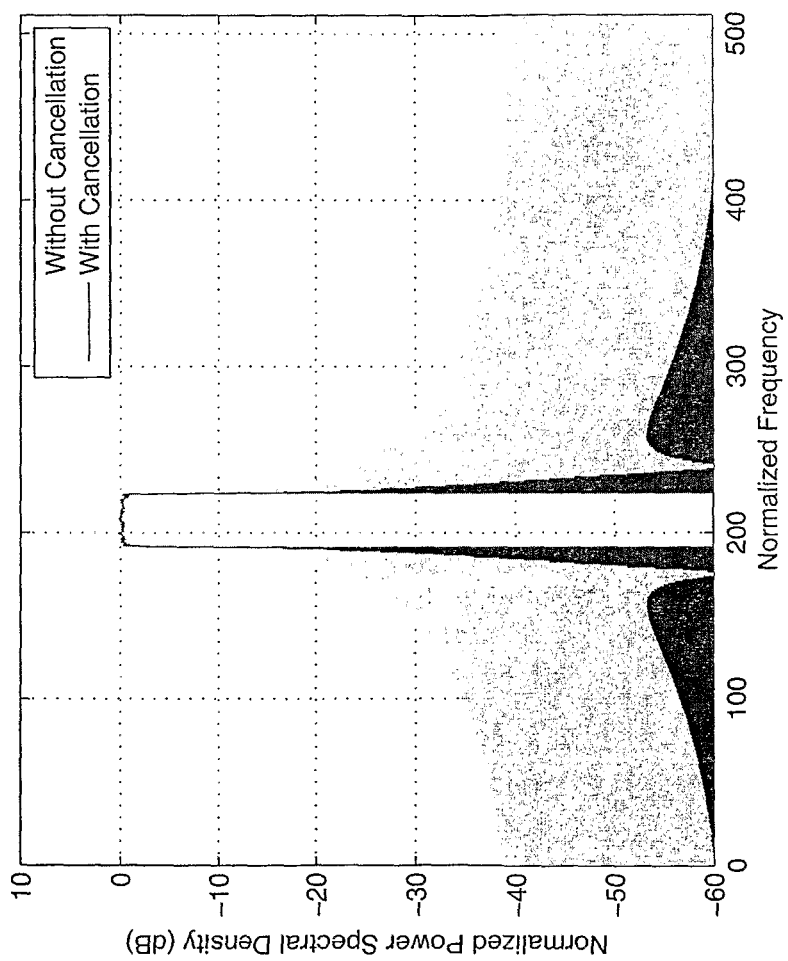
FIG. 8 shows the performance of double side out-of-band emission cancellation.

To demonstrate the performance of the disclosed out-of-band emission cancellation technique, FIGS. 7 and 8 show the normalized power spectral densities of a transmitted signal in a frequency band with N=32 subcarriers after single side out-of-band emission cancellation and double side out-of-band emission cancellation respectively. For the double side out-of-band emission cancellation, the two weights not equal to 1 are set to zero. The parameter w is selected as (N+1)/2, which means that cancellation point(s) is set to the center of the adjacent band(s). It is observed that using the single side out-of-band emission cancellation the power spectral density is reduced by about 10 dB as compared with the one without cancellation, whereas using the double side out-of-band emission cancellation the power spectral density is reduced by about 20 dB.

Figure 9:
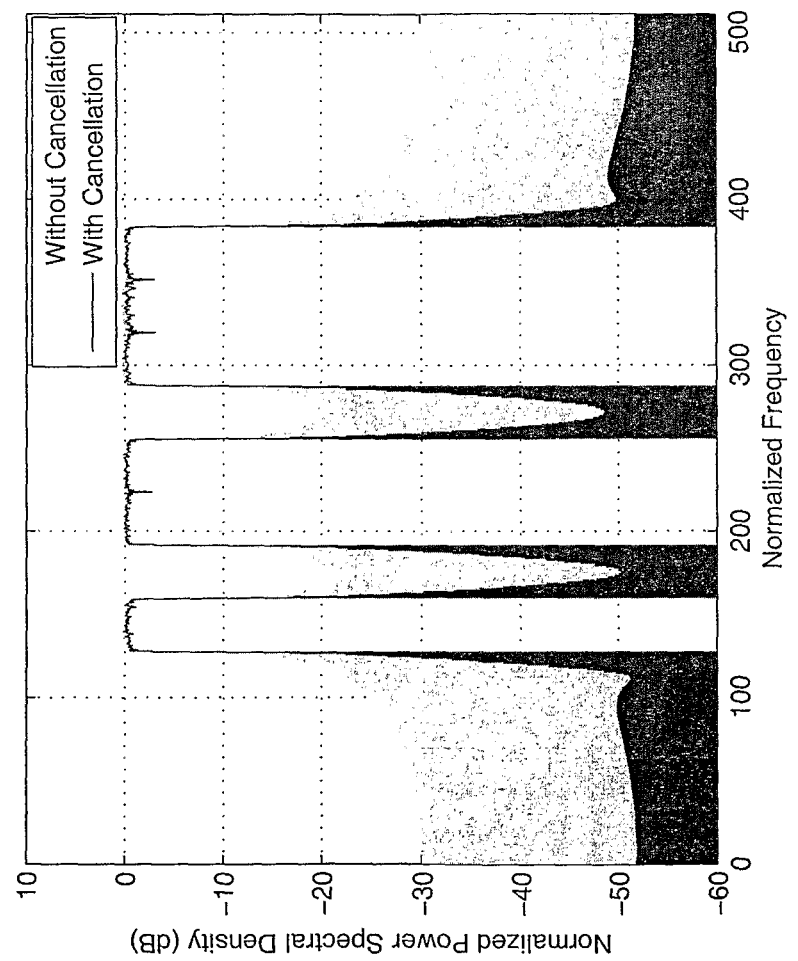
FIG. 9 shows out-of-band emission in unallocated bands under the multiband arrangement shown in FIG. 4.

The multiband arrangement shown in FIG. 4 is also used to determine the out-of-band emission in the unallocated bands when the transmitter transmits signals in multiple bands. FIG. 9 shows the normalized power spectral densities of the signals transmitted in band 1, 3, 4, 6, 7, and 8 with and without using the out-of-band emission cancellation technique. The same parameters N=32 and w=(N+1)/2 are used. It is seen that the emission in the unallocated band 2 and 5 is about −20 dB at the center of each band without out-of-band emission cancellation and is reduced to below −48.5 dB at the center of each band with the disclosed double side out-of-band emission cancellation technique.

The disclosed out-of-band emission cancellation techniques can be used in fixed point-to-point wireless links such as wireless backhaul to aggregate multiple frequency bands and channels to improve spectral efficiency and increase transmission data rates. They can be also used in cognitive wireless networks involving multiple frequency bands to enable dynamic band allocation and achieve optimized system performance. For instance, consider a cell in a wireless access network, where the spectrum availability is shown in FIG. 4. Channels/bands 2 and 5 are not available. In order to maximize the spectral efficiency without incurring sophisticated RF filters, the proposed method can be used to generate signals with the spectrum density shown in FIG. 9.

The disclosed technique does not use any guard band nor any dedicated frequency-domain or time-domain cancellation symbol, so the system spectral efficiency and power efficiency are improved as compared with other techniques.

The disclosed techniques are particularly applicable to the multi-gigabit wireless backhaul and cognitive wireless access systems where the flexibility of using multiple frequency bands is required. The techniques can be also used in any mobile communications system using orthogonal frequency division multiple access (OFDMA), such as the 3GPP's LTE system. Of course, other applications are possible.

The foregoing describes some embodiments that are illustrative and not restrictive on the scope of the invention.

The invention claimed is:

1. A transmission signal pre-processing method for out-of-band emission cancellation performed within a transmitter, the method comprising the steps of:
    weighting each of N subchannel symbols in a band by a calculated value in the range from 0 to 1, wherein weighting by the value 0 cancels the subchannel symbol and weighting by the value 1 results in the subchannel symbol being transmitted at full power;
    precoding said N weighed symbols by multiplication by a unitary matrix;
    wherein said N subchannel symbols are organized as a N×1 symbols matrix and said calculated values are organized in a N×N diagonal matrix, and said weighting is performed by multiplying the symbols matrix and the diagonal matrix;
    wherein said diagonal matrix and said unitary matrix are determined from an identity matrix of order N and a correction term; and
    wherein said identity matrix ($I_N$) and said correction term are of the form:

$$I_N - \frac{c_1 c_1^T}{\text{trace}(c_1 c_1^T)}$$

where:

$$c_1 = \left(\frac{1}{w}, \frac{1}{w+1}, \cdots, \frac{1}{w+N-1}\right)^T$$

and w is a frequency normalised by a subchannel carrier spacing.

2. A method of claim 1, performed in an Orthogonal Frequency Division Multiplexing (OFDM) scheme.

3. A method according to claim 1, wherein said identity matrix and said correction expression are the subject of single value decomposition to give said diagonal matrix and said unitary matrix.

4. A transmission signal pre-processing method for out-of-band emission cancellation performed within a transmitter, the method comprising the steps of:
    weighting each of N subchannel symbols in a band by a calculated value in the range from 0 to 1, wherein weighting by the value 0 cancels the subchannel symbol and weighting by the value 1 results in the subchannel symbol being transmitted at full power;
    precoding said N weighed symbols by multiplication by a unitary matrix;
    wherein said N subchannel symbols are organized as a N×1 symbols matrix and said calculated values are organized in a N×N diagonal matrix, and said weighting is performed by multiplying the symbols matrix and the diagonal matrix;
    wherein said diagonal matrix and said unitary matrix are determined from an identity matrix of order N and a correction term; and
    wherein said identity matrix and said correction term are of the form:

$$I_N - \frac{c_2 c_2^T}{\text{trace}(c_2 c_2^T)}$$

where:

$$c_1 = \begin{pmatrix} \frac{1}{w}, & \frac{1}{w+1}, & \cdots, & \frac{1}{w+N-1} \\ \frac{1}{w+N-1}, & \frac{1}{w+N-2}, & \cdots, & \frac{1}{w} \end{pmatrix}^T.$$

5. An out-of-band emission cancellation method performed within a transmitter comprising the steps of:
  performing mapping of input data bits into time domain data symbols;
  converting said time domain symbols into a plurality of subchannels;
  for each of N subchannels in a band:
    weighting each of N subchannel symbols by a calculated value in the range from 0 to 1, wherein weighting by the value 0 cancels the subchannel symbol and weighting by the value 1 results in the subchannel symbol being transmitted at full power; and
    precoding said N weighted symbols by multiplication by a unitary matrix;
  wherein said N subchannel symbols are organized as a N×1 symbols matrix and said calculated values are organized in a N×N diagonal matrix, and said weighting is performed by multiplying the symbols matrix and the diagonal matrix;
  wherein said diagonal matrix and said unitary matrix are determined from an identity matrix of order N and a correction expression; and
  wherein said identity matrix ($I_N$) and said correction expression are of the form:

$$I_N - \frac{c_1 c_1^T}{\text{trace}(c_1 c_1^T)}$$

where:

$$c_1 = \left(\frac{1}{w}, \frac{1}{w+1}, \cdots, \frac{1}{w+N-1}\right)^T$$

and w is a frequency normalized by a subchannel carrier spacing;
  transforming said precoded subchannels into orthogonal time domain subchannels;
  transmitting said time domain subchannels.

6. A method according to claim 5, performed in an Orthogonal Frequency Division Multiplexing (OFDM) scheme.

7. A method according to claim 5, wherein said identity matrix and said correction expression are the subject of single value decomposition to give said diagonal matrix and said unitary matrix.

8. An out-of-band emission cancellation method performed within a transmitter comprising the steps of:
  performing mapping of input data bits into time domain data symbols;
  converting said time domain symbols into a plurality of subchannels;
  for each of N subchannels in a band:
    weighting each of N subchannel symbols by a calculated value in the range from 0 to 1, wherein weighting by the value 0 cancels the subchannel symbol and weighting by the value 1 results in the subchannel symbol being transmitted at full power; and
    precoding said N weighted symbols by multiplication by a unitary matrix;
  wherein said N subchannel symbols are organized as a N×1 symbols matrix and said calculated values are organized in a N×N diagonal matrix, and said weighting is performed by multiplying the symbols matrix and the diagonal matrix.
  wherein said diagonal matrix and said unitary matrix are determined from an identity matrix of order N and a correction term;
  wherein said identity matrix and said correction term are of the form:

$$I_N - \frac{c_2 c_2^T}{\text{trace}(c_2 c_2^T)}$$

where:

$$c_1 = \begin{pmatrix} \frac{1}{w}, & \frac{1}{w+1}, & \cdots, & \frac{1}{w+N-1} \\ \frac{1}{w+N-1}, & \frac{1}{w+N-2}, & \cdots, & \frac{1}{w} \end{pmatrix}^T$$

and w is a frequency normalized by the subchannel carrier spacing;
  transforming said precoded subchannels into orthogonal time domain subchannels;
  transmitting said time domain subchannels.

9. A transmitter comprising:
  a module performing mapping of input data bits into time domain data symbols;
  a module converting said time domain symbols into a plurality of subchannels;
  for each of N subchannels in a band:
    a module weighting each of N subchannel symbols by a calculated value in the range from 0 to 1, wherein weighting by the value 0 cancels the subchannel symbol and weighting by the value 1 results in the subchannel symbol being transmitted at full power; and
    a module precoding said N weighted symbols by multiplication by a unitary matrix;
  wherein said N subchannel symbols are organized as a N×1 symbols matrix and said calculated values are organized in a N×N diagonal matrix, and said weighting is performed by multiplying the symbols matrix and the diagonal matrix;
  wherein said diagonal matrix and said unitary matrix are determined from an identity matrix of order N and a correction term;
  wherein said identity matrix ($I_N$) and said correction term are of the form:

$$I_N - \frac{c_1 c_1^T}{\text{trace}(c_1 c_1^T)}$$

where:

$$c_1 = \left(\frac{1}{w}, \frac{1}{w+1}, \cdots, \frac{1}{w+N-1}\right)^T$$

and w is a frequency normalized by a subchannel carrier spacing
  a module transforming said precoded subchannels into orthogonal time domain subchannels; and
  a radio frequency module transmitting said time domain subchannels.

10. A transmitter according to claim 9, wherein said transforming module is an inverse fast Fourier transform circuit.

11. A transmitter according to claim 9, wherein said identity matrix and said correction expression are the subject of single value decomposition to give said diagonal matrix and said unitary matrix.

12. A transmitter comprising:
a module performing mapping of input data bits into time domain data symbols;
a module converting said time domain symbols into a plurality of subchannels;
for each of N subchannels in a band:
a module weighting each of N subchannel symbols by a calculated value in the range from 0 to 1, wherein weighting by the value 0 cancels the subchannel symbol and weighting by the value 1 results in the subchannel symbol being transmitted at full power; and
a module precoding said N weighted symbols by multiplication by a unitary matrix;
wherein said N subchannel symbols are organized as a N×1 symbols matrix and said calculated values are organized in a N×N diagonal matrix, and said weighting is performed by multiplying the symbols matrix and the diagonal matrix;
wherein said diagonal matrix and said unitary matrix are determined from an identity matrix of order N and a correction term;
wherein said identity matrix and said correction term are of the form:

$$I_N - \frac{c_2 c_2^T}{\text{trace}(c_2 c_2^T)}$$

where:

$$c_1 = \begin{pmatrix} \frac{1}{w}, & \frac{1}{w+1}, & \cdots, & \frac{1}{w+N-1} \\ \frac{1}{w+N-1}, & \frac{1}{w+N-2}, & \cdots, & \frac{1}{w} \end{pmatrix}^T$$

and w is a frequency normalized by the subchannel carrier spacing
a module transforming said precoded subchannels into orthogonal time domain subchannels; and
a radio frequency module transmitting said time domain subchannels.

* * * * *